(12) United States Patent
Yamazaki et al.

(10) Patent No.: US 9,216,310 B2
(45) Date of Patent: Dec. 22, 2015

(54) HYDROTALCITE LIKE SUBSTANCE, PROCESS FOR PRODUCING THE SAME AND METHOD OF IMMOBILIZING HAZARDOUS SUBSTANCE

(71) Applicants: Waseda University, Tokyo (JP); JDC Corporation, Tokyo (JP)

(72) Inventors: Atsushi Yamazaki, Tokyo (JP); Mai Takahashi, Tokyo (JP)

(73) Assignees: WASEDA UNIVERSITY, Tokyo (JP); JDC CORPORATION, Tokyo (JP)

( * ) Notice: Subject to any disclaimer, the term of this patent is extended or adjusted under 35 U.S.C. 154(b) by 92 days.

(21) Appl. No.: 14/052,400

(22) Filed: Oct. 11, 2013

(65) Prior Publication Data

US 2014/0039236 A1    Feb. 6, 2014

Related U.S. Application Data

(62) Division of application No. 13/867,774, filed on Apr. 22, 2013, now abandoned, which is a division of application No. 10/597,380, filed as application No. PCT/JP2005/004668 on Mar. 16, 2005, now abandoned.

(30) Foreign Application Priority Data

Mar. 16, 2004 (JP) ................................. 2004-074093

(51) Int. Cl.

| | | |
|---|---|---|
| A62D 3/36 | (2007.01) | |
| B01J 20/08 | (2006.01) | |
| B01J 20/12 | (2006.01) | |
| B01J 20/16 | (2006.01) | |
| B01J 20/18 | (2006.01) | |
| B01J 41/10 | (2006.01) | |
| B09B 3/00 | (2006.01) | |
| B09C 1/08 | (2006.01) | |
| B82Y 30/00 | (2011.01) | |
| C01F 7/00 | (2006.01) | |
| A62D 3/33 | (2007.01) | |
| B01J 20/04 | (2006.01) | |

(52) U.S. Cl.
CPC .. *A62D 3/36* (2013.01); *A62D 3/33* (2013.01); *B01J 20/041* (2013.01); *B01J 20/08* (2013.01); *B01J 20/12* (2013.01); *B01J 20/165* (2013.01); *B01J 20/18* (2013.01); *B01J 41/10* (2013.01); *B09B 3/0041* (2013.01); *B09C 1/08* (2013.01); *B82Y 30/00* (2013.01); *C01F 7/005* (2013.01); *B01J 2220/42* (2013.01); *C01P 2002/22* (2013.01); *C01P 2002/60* (2013.01); *C01P 2002/72* (2013.01); *C01P 2002/78* (2013.01); *C01P 2004/64* (2013.01)

(58) Field of Classification Search
CPC ........... A62D 3/36; A62D 3/33; B01J 20/041; B01J 41/10; B01J 20/08; B01J 20/12; B01J 20/165; B01J 20/18; B01J 2220/42; B09B 3/0041; B09C 1/08; C01F 7/005; B82Y 30/00; C01P 2002/72; C01P 2002/60; C01P 2004/64; C01P 2002/78; C01P 2002/22

USPC .................. 423/600, 593.1, 594.16; 252/184
See application file for complete search history.

(56) References Cited

U.S. PATENT DOCUMENTS

| | | |
|---|---|---|
| 5,360,547 A | 11/1994 | Cockett et al. |
| 6,180,764 B1 | 1/2001 | Noweck et al. |
| 6,652,828 B2 | 11/2003 | Stamires et al. |
| 7,022,302 B2 | 4/2006 | Oza et al. |
| 7,022,304 B2 | 4/2006 | Stamires et al. |
| 7,211,235 B2 | 5/2007 | Eisgruber et al. |
| 2003/0114699 A1 | 6/2003 | Brima et al. |
| 2007/0259217 A1 | 11/2007 | Logan |
| 2009/0297890 A1 | 12/2009 | Shimomura et al. |

FOREIGN PATENT DOCUMENTS

| | | |
|---|---|---|
| EP | 566260 | 10/1993 |
| EP | 1947716 | 7/2008 |

(Continued)

OTHER PUBLICATIONS

Miyata, Shigeo, et al., "Synthesis of Hydrotalcite-Like Compounds and Their Physico-Chemical Properties," Clays and Clay Minerals, vol. 25, pp. 14-18, Pergamon Press 1977.

Sell, et al., Use of an Oxygen Gas Diffusion Cathode and a Three-Dimensional Packed Bed Anode in a Bioelectrochemical Fuel Cell, Applied Microbiology and Biotechnology, Springer Verlag, Berlin, Germany, vol. 31, No. 2, Jan. 1, 1989 pp. 211-212.

Zhao et al. Preparation of Layered Double-Hydroxide Nanomaterials with a Uniform Crystallite Size Using a New Method Involving Separate Nucleation and Aging Steps, Chem. Mater. 2002, 14, 4286-4291.

(Continued)

*Primary Examiner* — Anthony J Zimmer
(74) *Attorney, Agent, or Firm* — Duane Morris LLP; J. Rodman Steele, Jr.; Gregory M. Lefkowitz (57) ABSTRACT

A hydrotalcite-like substance capable of ion exchange with target anions, being of small crystal size that exhibits large basal spacing and excels at anion exchange performance; a process for producing the same; and a method of immobilizing hazardous substances. The hydrotalcite-like substance is produced by mixing an acidic solution containing aluminum and magnesium ions with an alkaline solution containing an alkali to synthesize a hydrotalcite-like substance, followed by, without ageing, water removal or neutralization. The molar ratio of aluminum ions and magnesium ions is preferably in the range of 1:5 to 1:2. Hazardous substances can be immobilized by pulverizing the hydrotalcite-like substance after synthesis and adding the powder to a subject, or adding a hydrotalcite-like substance in slurry form to a subject, or carrying out addition so as to cause the synthesis directly at the position of the subject. Furthermore, anion adsorption can be performed by a filter containing the hydrotalcite-like substance.

11 Claims, 6 Drawing Sheets

(56) References Cited

FOREIGN PATENT DOCUMENTS

| | | |
|---|---|---|
| JP | 48-29478 | 9/1973 |
| JP | 52-003353 | 1/1977 |
| JP | 58-214338 | 12/1983 |
| JP | 04-008747 | 1/1992 |
| JP | 06-007672 | 1/1994 |
| JP | 06-329410 | 11/1994 |
| JP | 07-284657 | 10/1995 |
| JP | 10-216742 | 8/1998 |
| JP | 2000-033387 | 2/2000 |
| JP | 2000-233188 | 8/2000 |
| JP | 2000-264626 | 9/2000 |
| JP | 2001-269664 | 10/2001 |
| JP | 2003-026418 | 1/2003 |
| JP | 2007-091534 | 4/2007 |

OTHER PUBLICATIONS

Miyata, Shigeo, Anion-Exchange Properties of Hydrotalcite-Like Compounds, Clays and Clay Materials, vol. 31, No. 4, 305-311, 1983.

Constantino et al., New Synthetic Routes to Hydrotalcite-Like Compounds—Characterisation and Properties of the Obtained Materials, Eur. J. Inorg. Chem. 1998, 1439-1446.

Misra et al., Composition and Properties of Synthetic Hydrotalcites, Clays and Clay Materials, vol. 40, No. 2, 145-150, 1992.

Miyata, Shigeo, Physico-Chemical Properties of Synthetic Hydrotalcites in Relation to Composition, Clays and Clay Materials, vol. 28, No. 1, 50-56, 1980.

Cavani, F., et al., "Hydrotalcite-Type Anionic Clays: Preparation, Properties and Applications;" Catalysis Today, 1991, vol. 11, pp. 173-301.

Effect of Carbonic Acid on Boron Fluid of 10mg/L

HYDROTALCITE LIKE SUBSTANCE, PROCESS FOR PRODUCING THE SAME AND METHOD OF IMMOBILIZING HAZARDOUS SUBSTANCE

CROSS-REFERENCE TO RELATED APPLICATIONS

This application is a divisional of U.S. patent application Ser. No. 13/867,774 filed Apr. 22, 2013, which is a divisional of U.S. patent application Ser. No. 10/597,380, having a 35 U.S.C. 371(c) date of Jun. 23, 2008, which is a U.S. National Phase application of International Application No. PCT/JP2005/004668, filed Mar. 16, 2005, which claims priority to Japanese Application No. JP 2004-074093 filed Mar. 16, 2004, the entireties of which are incorporated herein by reference.

TECHNICAL FIELD

The present invention relates to a hydrotalcite-like substance, a process for producing the same and a method of immobilizing hazardous substance.

BACKGROUND ART

Hydrotalcite which is a kind of naturally-occurring layered clay mineral, is mainly comprised of hydroxides of elements that exist naturally abundantly, such as magnesium and aluminum, and the synthesis thereof is capable of being performed comparatively easily. Accordingly, various synthesizing methods have heretofore been disclosed.

For example, a patent document 1 discloses a method of producing a hydrotalcite in a water solvent, using magnesium hydroxide as a source of magnesium, while a patent document 2 discloses a method of allowing magnesium ion to react with aluminum ion in a solution under the presence of alkali.

Moreover, it has been known that a hydrotalcite has an anion exchange property, and thus it is expected that a hydrotalcite will be able to make a contribution to: water quality improvement of contaminated water; elution prevention of hazardous substances; improvement of soil quality; and promotion of stabilization of hazardous substances in a waste repository etc., in the fields of the safety improvement techniques of wastes and the detoxification and environment improvement techniques, if immobilization of anionic hazardous substances such as arsenic, fluoride, boron, selenium, sexavalent chrome, nitrite ion, and etc. is possible by taking advantage of such anion exchange property.

According to the conventional highly crystalline hydrotalcite products, however, due to the ion exchange occurring preferentially between the hydrotalcite products and carbon dioxide in the air or carbonate ions in water, ion exchange against target anions would not occur by an ordinary method. As a result, the conventional ones could not achieve the desired effect in immobilization of anionic hazardous substances. This is presumably because the highly crystalline hydrotalcite produced by the conventional techniques have such a large crystallite size that the ion exchanging capacity has been deteriorated.

Patent document 1
Japanese Un-examined Patent Publication No. 6-329410
Patent document 2
Japanese Un-examined Patent Publication No. 2003-26418

DISCLOSURE OF THE INVENTION

Problems to be Solved by the Invention

In view of the above-mentioned problems, it is, therefore, an object of the present invention to provide a hydrotalcite-like substance which ensures so high an anion adsorption effect that ion exchange against a target anion may occur.

It is another object of the present invention to provide a process for producing such hydrotalcite-like substance.

It is a further object of the invention to provide a method of immobilizing hazardous substances, using such hydrotalcite-like substance.

Means for Solving the Problems

In order to solve the above-mentioned problems, the inventors of the present invention have studied a process for controlling or inhibiting the growth of crystal when synthesizing a hydrotalcite by mixing an acidic solution containing aluminum ions and magnesium ions with an alkaline solution, although a highly crystalline hydrotalcite has conventionally been produced by leaving it unattended through "ageing" to thereby grow the crystals. As a result of the study, the inventors of the present invention have found out the fact that a hydrotalcite-like substance having a 20 nm or less crystallite size can be obtained by additional water removal or neutralization process, without ageing. The present invention has been made based on this finding.

The hydrotalcite-like substance of the present invention is characterized in that it is synthesized by mixing an acidic solution containing aluminum ions and magnesium ions with an alkaline solution containing alkalis, and then subjecting the same to water removal or neutralization process, without ageing, so as to have a crystallite size (grain size) of 20 nm or less.

The hydrotalcite-like substance of the present invention is characterized in that it has an average crystallite size of 10 nm or less.

The hydrotalcite-like substance of the present invention is characterized in that a basal spacing thereof is 0.85 nm or more in a nitric acid type, while 0.78 nm or more in a carbonic acid type and a chlorine type.

The hydrotalcite-like substance of the present invention is characterized in that it enables simultaneous anon adsorption or anion exchange under the co-presence of carbonate ions.

A process for producing a hydrotalcite-like substance of the present invention is characterized in that the method comprises the steps of: mixing an acidic solution containing aluminum ions and magnesium ions with an alkaline solution containing alkalis to produce a hydrotalcite-like substance; and then subjecting the hydrotalcite-like substance thus produced to water removal or neutralization process without ageing.

The process for producing a hydrotalcite-like substance of the present invention is characterized in that a molar ratio of said aluminum ions to said magnesium ions is in a range of from 1:5 to 1:2.

The process for producing a hydrotalcite-like substance of the present invention is characterized in that said acidic solution contains aluminum compound and/or magnesium compound that are/is not dissolved therein.

The process for producing a hydrotalcite-like substance of the present invention is characterized in that at least one selected from a group consisting of alumina, sodium aluminate, aluminum hydroxide, aluminum chloride, aluminum nitrate, bauxite, residue left after producing alumina from bauxite and aluminum sludge is used as an aluminum source of said aluminum ions.

The process for producing a hydrotalcite-like substance of the present invention is characterized in that at least one selected from a group consisting of brucite, magnesium chloride, magnesium hydroxide, magnesite and calcined magnesite is used as a magnesium source of said magnesium ions.

The process for producing a hydrotalcite-like substance of the present invention is characterized in that at least one selected from a group consisting of sodium hydroxide, calcium hydroxide, lime and solidification material for cement is used as said alkalis.

The process for producing a hydrotalcite-like substance of the present invention is characterized in that neither said acidic solution nor said alkaline solution contains carbonate ions.

The process for producing a hydrotalcite-like substance of the present invention is characterized in that said acidic solution is mixed with said alkaline solution at 100 degrees C. or lower.

A process for immobilizing a hazardous substance of the present invention is characterized in that the process comprises the step of adding a hydrotalcite-like substance to an object to be immobilized in a manner that the synthesis of the hydrotalcite-like substance occurs directly on the object to be immobilized through the mixing of an acidic solution containing aluminum ions and magnesium ions with an alkaline solution containing alkalis, and the subsequent water removal therefrom or neutralization process applied thereto.

The process for immobilizing a hazardous substance of the present invention is characterized in that said hydrotalcite-like substance is added to the object to be immobilized after adding alkalis to the object.

Another process for immobilizing a hazardous substance of the present invention is characterized in that the process comprises the step of adding to an object to be immobilized an acidic solution containing aluminum ions and magnesium ions, while mixing with alkalis.

The process for immobilizing a hazardous substance of the present invention is characterized in that a molar ratio of said aluminum ions to said magnesium ions is in a range of from 1:5 to 1:2.

The process for immobilizing a hazardous substance of the present invention is characterized in that said acidic solution contains aluminum compound and/or magnesium compound that are/is not dissolved therein.

The process for immobilizing a hazardous substance of the present invention is characterized in that at least one selected from a group consisting of alumina, sodium aluminate, aluminum hydroxide, aluminum chloride, aluminum nitrate, bauxite, residue left after producing alumina from bauxite and aluminum sludge is used as an aluminum source of said aluminum ions.

The process for immobilizing a hazardous substance of the present invention is characterized in that at least one selected from a group consisting of brucite, magnesium chloride, magnesium hydroxide, magnesite and calcined magnesite is used as a magnesium source of said magnesium ions.

The process for immobilizing a hazardous substance of the present invention is characterized in that at least one selected from a group consisting of sodium hydroxide, calcium hydroxide, lime and solidification material for cement is used as said alkalis.

The process for immobilizing a hazardous substance of the present invention is characterized in that zeolite and/or bentonite are/is used together with said hydrotalcite-like substance.

The process for immobilizing a hazardous substance of the present invention is characterized in that the object to be immobilized is a contaminated soil polluted with a hazardous substance, wastes containing contaminated water or hazardous substances, leachate thereof and the like, and said hydrotalcite-like substance is added to the contaminated soil or wastes together with zeolite and/or bentonite.

The process for immobilizing a hazardous substance of the present invention is characterized in that said contaminated soil is covered with a filter layer of zeolite and/or bentonite, and another filter layer of said hydrotalcite-like substance.

An adsorbent of the present invention is characterized in that zeolite and/or bentonite are/is used together with said hydrotalcite-like substance.

According to the hydrotalcite-like substance of the present invention, anion adsorption effect is enhanced and thus ion exchange against target anions can be achieved.

According to the hydrotalcite-like substance of the present invention, it is possible to produce a hydrotalcite-like substance having a small crystallite size, a large basal spacing, low anion selectivity and thus excellent anion exchange capacity.

According to the process for immobilizing a hazardous substance of the present invention, anion exchange is allowed to occur between the hydrotalcite-like substance and a target object, thus enabling a hazardous substance to be immobilized.

According to the adsorbent of the present invention, anion exchange is allowed to occur between the hydrotalcite-like substance and a target object, thus enabling a hazardous substance to be adsorbed.

According to the use of the hydrotalcite-like substance for liquid or soil treatment according to the present invention, anion exchange is allowed to occur between the hydrotalcite-like substance and a target object, thus enabling a hazardous substance to be adsorbed and immobilized.

BRIEF DESCRIPTION OF THE DRAWINGS

FIG. 4A is a graph showing results of chromium ion adsorption tests as a function of measured value verses time, while

FIG. 5A is a graph showing a result of a boron ion adsorption test as a function of measured value verses time, while

FIG. 6A is a graph showing a result of a fluoride ion adsorption test as a function of measured value verses time, while

BEST MODE FOR CARRYING OUT THE INVENTION

Next is a description of a process for producing a hydrotalcite-like substance, and a method of immobilizing a hazardous substance according to the present invention.

First Example

A hydrotalcite-like substance and a process for producing the same in accordance with an example of the present invention will be explained hereafter. Although temperature is kept at 80 degrees C. or less in all the processes in this example, temperature conditions are not limited thereto, but should just be about 100 degrees C. or lower.

First, in order to produce a hydrotalcite-like substance of the present invention, an acidic solution containing aluminum ions and magnesium ions are prepared.

As for an aluminum source of aluminum ions, it is not limited to a specific substance as long as it can generate aluminum ions underwater. For example, alumina, sodium aluminate, aluminum hydroxide, aluminum chloride, aluminum nitrate, bauxite, residue left after producing alumina from bauxite, aluminum sludge, etc. may be used. These aluminum sources may be used either independently or in combination with one or more other sources.

As for a magnesium source of magnesium ions, it is not limited to a specific substance as long as it can generate magnesium ions underwater. For example, brucite, magnesium chloride, magnesium hydroxide, magnesite, and calcined magnesite etc. can be used. These magnesium sources may be used either independently or in combination with one or more other sources.

In the meantime, aluminum compounds as the above-mentioned aluminum sources and magnesium compounds as the above-mentioned magnesium sources do not need to be dissolved completely, if aluminum ions and magnesium ions are present in said acidic solution. Accordingly, even if the undissolved aluminum compounds and/or the magnesium compounds are contained in the acidic solution, a hydrotalcite of the invention can be produced satisfactorily.

It is known that the general chemical formula of a hydrotalcite comprising aluminum ions and magnesium ions is given as: $Mg^{2+}_{1-x}Al^{3+}_{x}(OH)_2 (A^{n-})_{x/n}mH_2O$ ($A^{n-}$:anion), wherein a molar ratio of aluminum ions and magnesium ions is 1:3 (x=0.25), according to the most common composition of a highly crystalline hydrotalcite. Accordingly, it is preferable that the molar ratio of aluminum ions to magnesium ions in an acidic solution be in a range of from 1:5 to 1:2. By employing that molar ratio, there can be produced a hydrotalcite-like substance advantageously in terms of mass balance, without wasting aluminum sources and magnesium sources.

In the meantime, when preparing said acidic solution, it is preferable to use nitric acid or hydrochloric acid in order to acidify the solution.

Next, said acidic solution containing aluminum ions and magnesium ions is mixed with an alkaline solution containing alkalis. Preferably, the alkaline solution may have a pH of 8-11. A hydrotalcite-like substance with small crystallite size (i.e., grain size) can be produced promptly by agitating the alkaline solution violently at the time of the mixing.

Due to the hydrotalcite-like substance being small in crystallite size, the solution becomes colloidal at the time of mixing. Preferably, the acidic solution may be mixed with the alkaline solution at once, or otherwise, the former may be delivered by drops into the latter. It is to be noted that they may be mixed with each other through any other suitable methods.

As for the alkali to be contained in the alkaline solution, it is not limited to a specific substance as long as it can make the solution alkaline. For example, sodium hydroxide, calcium hydroxide, lime, and solidification material for cement etc. can be used. Alternatively, sodium carbonate, potassium carbonate, ammonium carbonate, ammonia water, sodium borate, potassium borate etc. may be used. These alkalis may be used either independently or in combination with one or more other sources.

Moreover, due to the ion exchange occurring preferentially between the highly crystalline hydrotalcite and carbonate ions, ion exchange against target anions would not occur efficiently if such carbonate ions are contained. Accordingly, as for a hydrotalcite-like substance as well, it is preferable that the said acidic solution and alkaline solution contain no carbonate ions in order to achieve efficient ion exchange against target anions.

Then, the hydrotalcite-like substance is produced by mixing the acidic solution with the alkaline solution, which is then subjected to water removal or neutralization process without performing ageing.

Here, the language "water removal or neutralization process without performing ageing" means that removal of water or neutralization is carried out immediately upon completion of the mixing of the acidic solution with the alkaline solution. For the removal of water may be employed ordinary methods such as suction filtration, centrifugal separation or separation of supernatant solution. It is to be noted that the hydrotalcite-like substance is neutralized substantially by removing water.

Whilst the hydrotalcite-like substance immediately after removing water is turned into a gel state, it may further undergo a drying process so as to be turned into a powder. It is to be noted that the hydrotalcite-like substance of the present invention has a good anion adsorption effect, whether in such a gel state or in such a powder sate.

Alternatively, in order to ensure that no ageing is performed, the hydrotalcite-like substance after removing water may be washed. In addition, ageing of hydrotalcite-like substance proceeds only in an alkaline solution.

As is apparent from the foregoing, performing no ageing process makes it possible to produce a hydrotalcite-like substance with small crystallite size, without the growth of the crystal thereof. In other words, it enables the inhibiting or controlling of the growth of crystal. The hydrotalcite-like substance thus obtained in accordance with the present invention has a crystallite size of 20 nm or less, which is 10 nm on average. As a crystallite size more than 20 nm leads to a sudden decrease in anion exchange capacity serving as an anion (except for carbonate ion) adsorption effect, the hydrotalcite-like substance of the present invention, having a crystallite size of 20 nm or less, and an average crystallite size of 10 nm or less, indicates high anion exchange capacity.

Furthermore, by keeping temperature conditions at 80 degrees C. or less throughout the processes, the hydrotalcite-like substance of the present invention is allowed to have an average crystallite size of 10 nm or less, and a basal spacing of 0.85 nm or more with a nitric acid type, and 0.78 nm or more with a carbonic acid type and a chlorine type.

Figure 1:
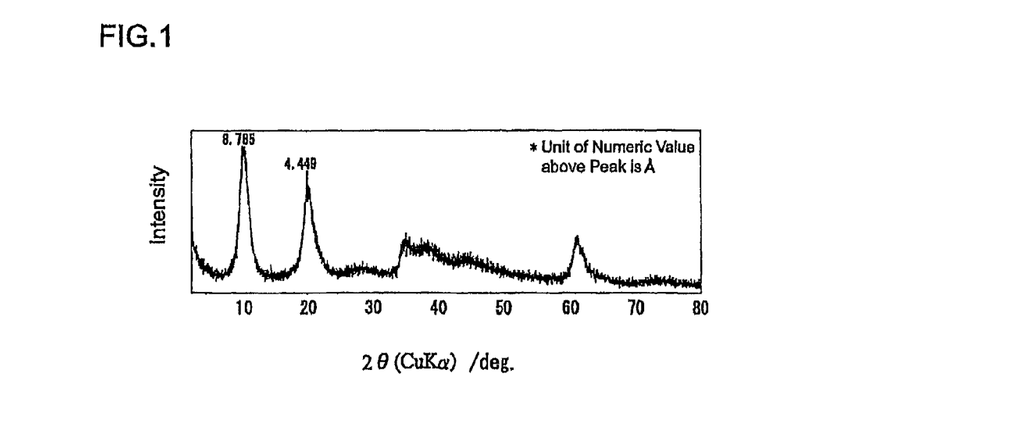
FIG. 1 is an XRD pattern showing a measurement result of X ray diffraction in accordance with an example of the present invention.

Referring to FIG. 1, it is an XRD pattern showing a measurement result of X ray diffraction of the hydrotalcite-like substance according to the present example of the invention. The crystallite sizes determined from the Scherrer's equation, using those results are shown in Table 1.

TABLE 1

| CRYSTALLITE SIZE | | |
|---|---|---|
| STANDARD SAMPLE | MICA | Si |
| Example | 9.1 nm | 9.2 nm |
| Comparative Example | 23.3 nm | 22.8 nm |

From the measurement result, it was confirmed that the commercially available hydrotalcite products as the comparative examples have a crystallite size greater than 20 nm, while the ones obtained by the present example have an average crystallite size as small as 10 nm or less. As for the basal spacing, it was determined from the Bragg equation, using $2\theta$ (theta) value at the peak where $2\theta$ appeared at the lowest angle. As a result, it was confirmed that the basal spacing was 0.875 nm in the example 1. In the meantime, the term "basal spacing" is one used in crystallography and mineralogy that denotes a unit thickness or a cycle of a crystal perpendicular to a plate surface in the case of a plate crystal.

As discussed above, the hydrotalcite-like substance of the present invention is synthesized by mixing an acidic solution containing aluminum ions and magnesium ions with an alkaline solution containing alkalis, and then subjecting the obtained mixture to water removing process or neutralization process, without performing ageing, thereby resulting in a crystallite size of 20 nm or less and thus a large total surface area of a crystal, thereby obtaining the one having an excellent anion exchange capacity.

Also, the method of producing the hydrotalcite-like substance of the present invention includes the steps of synthesizing a hydrotalcite-like substance by mixing an acidic solution containing aluminum ions and magnesium ions with an alkaline solution containing alkalis; and then subjecting the obtained hydrotalcite-like substance to water removing process or neutralization process, without performing ageing.

Thus, it is possible to produce a hydrotalcite-like substance having a small crystallite size and a large basal spacing. Due to the crystallite size being as small as 20 nm or less, and the average crystallite size being as small as 10 nm or less, the resultant total surface area of the crystal becomes large, thus obtaining the hydrotalcite-like substance having excellent anion exchange capacity.

Moreover, there can be produced a hydrotalcite-like substance advantageously in terms of mass balance, without wasting aluminum sources and magnesium sources if the molar ratio of aluminum ions to magnesium ions is in a range of from 1:5 to 1:2.

Alternatively, said acidic solution may contain aluminum compound and/or magnesium compound that are/is not dissolved therein. Further, as an aluminum source of aluminum ions may be used at least one selected from a group consisting of alumina, sodium aluminate, aluminum hydroxide, aluminum chloride, aluminum nitrate, bauxite, residue left after producing alumina from bauxite and aluminum sludge.

As a magnesium source of magnesium ions may be used one or more materials selected from a group consisting of brucite, magnesium chloride, magnesium hydroxide, magnesite and calcined magnesite. As an alkali, at least one of sodium hydroxide, calcium hydroxide, lime and solidification material for cement may be used. As a result, it is possible to produce a hydrotalcite-like substance, using inexpensive raw materials, at an extremely low cost. Furthermore, if waste is used as materials, it will lead to effective use of resources.

Furthermore, ion exchange can be efficiently carried out against target anions without causing ion exchange preferentially against carbonate ions, due to said acidic solution and said alkaline solution containing no carbonate ions.

In the meantime, the hydrotalcite-like substance of the present example has a wide stability region relative to pH ranging from 2.5 to 12, and different types of hydrotalcite-like substances are produced, according to a type of acid to be used, such as a nitric acid type, a carbonic acid type, a hydrochloric acid type, and a sulfuric acid type, and the like. Nevertheless, the fundamental ion exchange capacity tends to be unchanged.

In the following items 1) to 5) are shown results of various tests performed using the hydrotalcite-like substances of the example in accordance with the invention.

Figure 2:
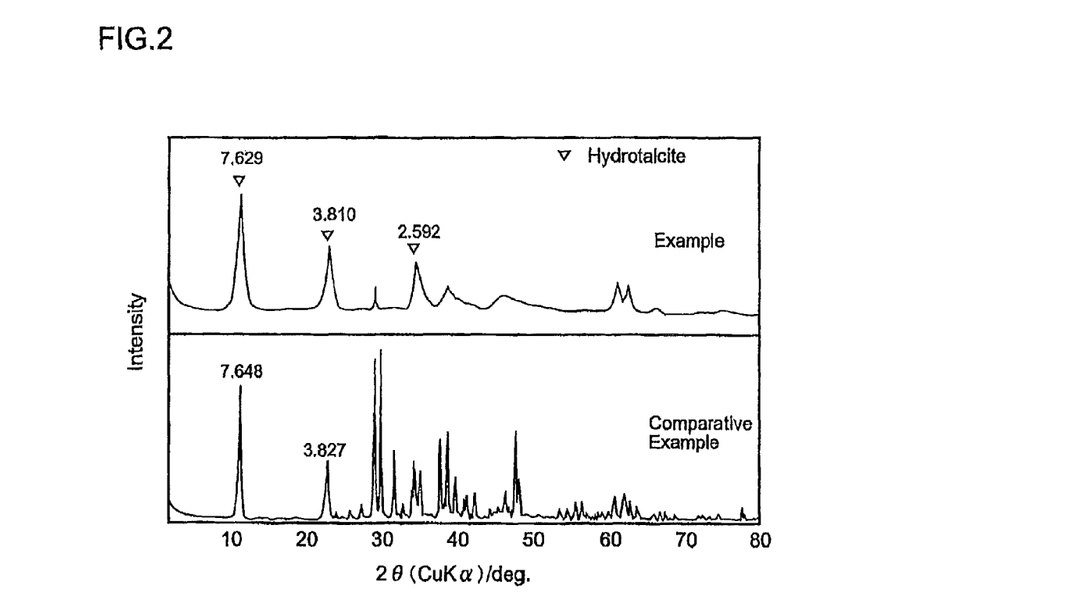
FIG. 2 are XRD patterns showing respective measurement results of X ray diffraction in the example of FIG. 1 and a comparative example, where the ageing of the example advanced to some extent.

1) FIG. 2 shows the result of X ray diffraction measurement of the hydrotalcite-like substance of the present example and a commercialized product as a comparative example. The result shows that the hydrotalcite-like substance of the present example is featured by very few peaks of impurities such as chloride, while a number of impurity peaks are observed in the comparative example, particularly in a range of from 30 to 60 degrees through the X ray diffraction. This result proves that the hydrotalcite-like substance of the present example contains few impurities.

Moreover, it has been confirmed that according to the hydrotalcite-like substance produced by the method of the present invention, there can be obtained a hydrotalcite-like substance of substantially constant quality, regardless of which specific aluminum and/or magnesium sources are used. This is attributed to the fact that the quantity of the impurities mixed at the time of crystal growth is decreased due to the ageing being not performed, as is shown in the above-mentioned data, and the impurities in the solutions are separated from the hydrotalcite-like substance together with water at the time of water removing process.

In the meantime, the positions and intensities of the peaks shown in FIG. 2 are slightly displaced from those shown in FIG. 1 because crystals have grown as ageing proceeds due to alkali residues.

Figure 3:
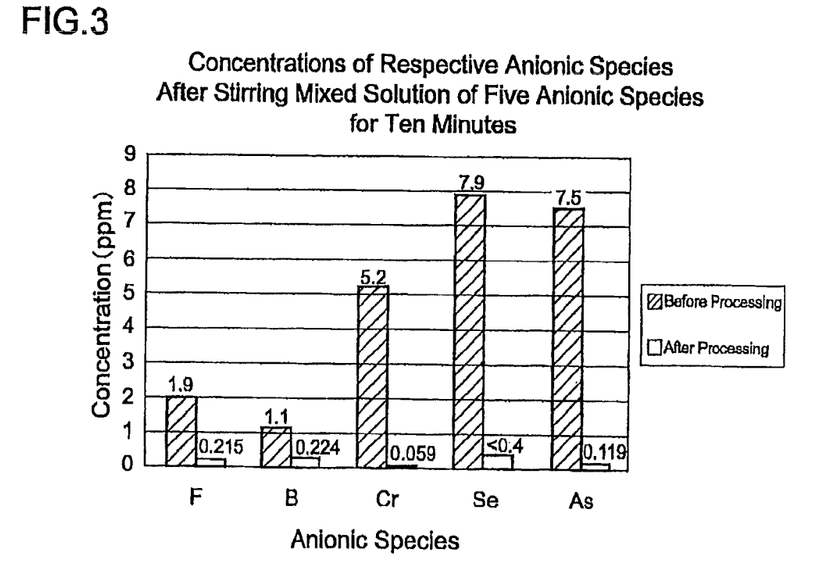
FIG. 3 is a graph showing results of adsorption tests which were carried out relative to a mixed solution of various anionic species, using a hydrotalcite-like substance according to the example of the present invention.

2) FIG. 3 shows the result of measurement of concentrations of various anionic species in a filtrate, using a spectrophotometer and ICP, in which a 100 ml mixed solution sample adjusted so that the concentrations of various anionic ions (F: fluoride, B: boron, Cr: chromium, Se: selenium, As: arsenic) may be 1 m mol/L, respectively, was prepared, and then subjected to a series of processing consisting of adding 1 g of a powder sample of the hydrotalcite-like substance produced according to the present example, agitating the same for 10 minutes with a magnetic stirrer, and then filtering the same. The concentrations before the processing are shown on the left-hand side while the concentrations after the processing on the right-hand side for each anion.

As is clearly seen therefrom, when the hydrotalcite-like substance of the present example was added, all of the five anionic species contained in the mixed solution were decreased to 5% or less in concentration simultaneously in 10 minutes. Thus, it was confirmed that according to the hydrotalcite-like substance of the present example, an adsorption effect can be obtained simultaneously with respect to all of the five anionic species contained.

Figure 4A:
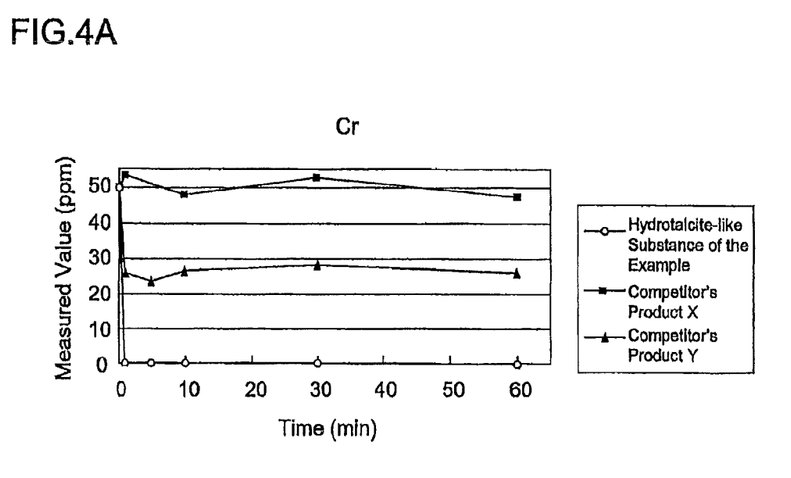
Figure 4B:
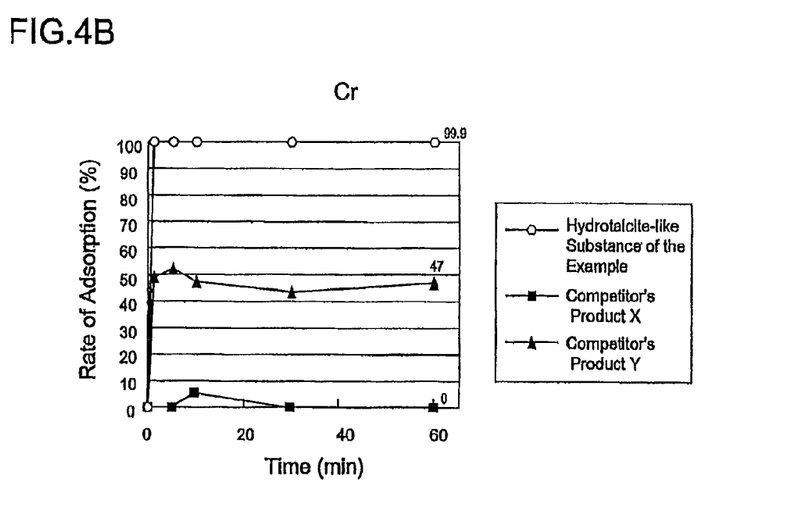
FIG. 4B is a graph showing results of chromium ion adsorption tests as a function of rate of adsorption verses time.
Figure 5A:
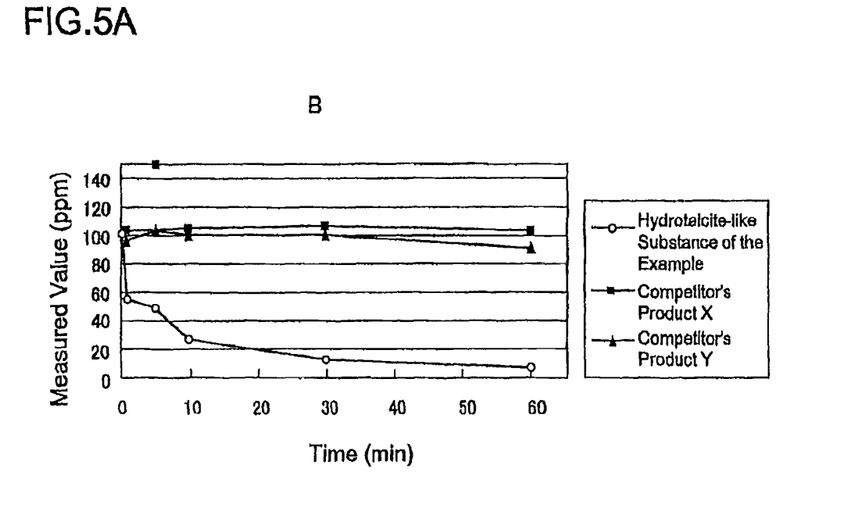
Figure 5B:
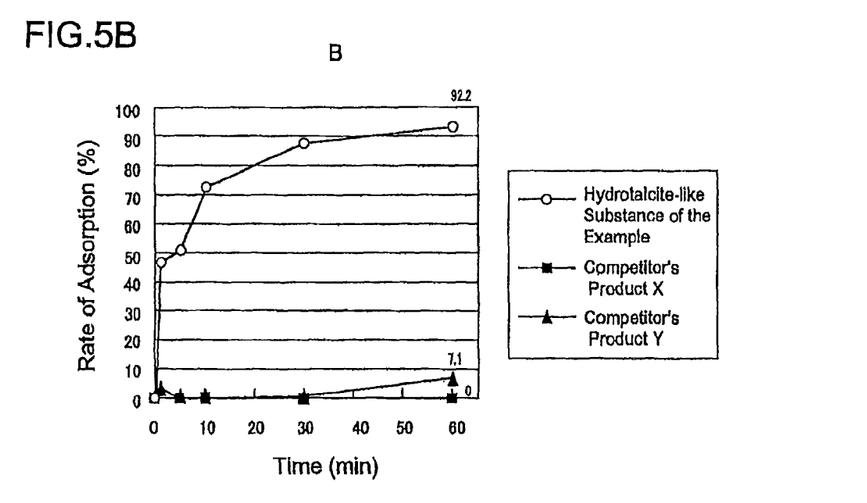
FIG. 5B is a graph showing results of boron ion adsorption tests as a function of rate of adsorption verses time.
Figure 6A:
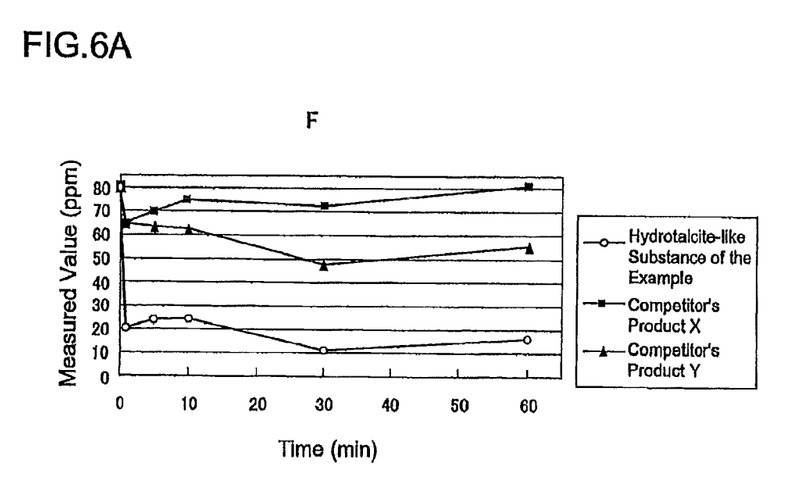
Figure 6B:
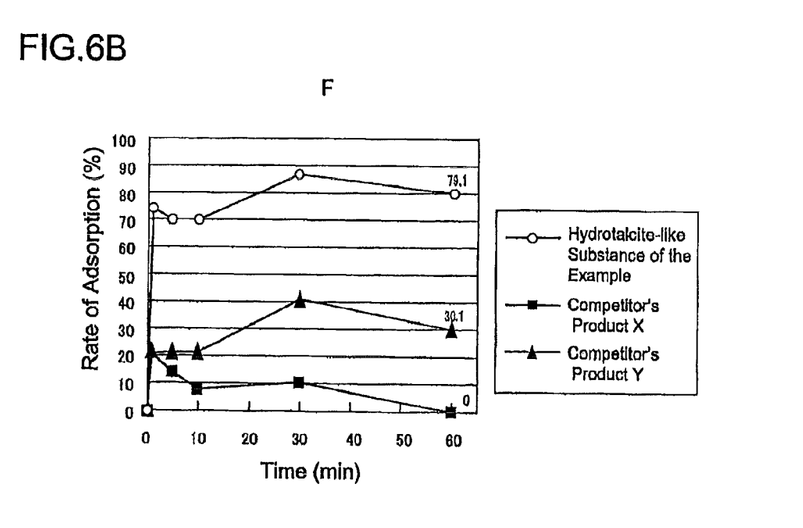
FIG. 6B is a graph showing results of fluoride ion adsorption tests as a function of rate of adsorption verses time.

3) FIGS. 4 through 6 are graphical representations of test results in which 100 ml sample solutions adjusted so as to contain chromium ions (Cr) of 50 ppm, boron ions of 100 ppm, and fluoride ions of 80 ppm, at initial concentrations, respectively, were prepared, and then 1 g of the powder sample of the hydrotalcite-like substance produced according to the present example, competitor's product X or other competitor's product Y was added to each sample, which was then stirred for 10 minutes by a magnetic stirrer, and filtered. A horizontal axis in each graph denotes a stirring time, while a vertical axis therein denotes a concentration (ppm) in FIGS. 4(A), 5(A) and 6(A), and a rate of adsorption (%) in FIG. 4(B), FIG. 5(B) and FIG. 6(B), respectively.

As shown in FIG. 4, substantially no chromium ions were adsorbed even after stirring for 60 minutes by the competitor's product X, while the rate of adsorption thereof was, 47% after stirring for 60 minutes in other competitor's product Y. According to the hydrotalcite-like substance of the present example, however, the rate of adsorption of chromium ions substantially reached more than 95% at the point of one-minute-stirring, and was kept as high as 99.9% at any subsequent point up to the 60 minute-stirring.

Likewise, as shown in FIG. 5, substantially no boron ions were adsorbed even after stirring for 60 minutes by the competitor's product X, while the rate of adsorption thereof was 7% after stirring for 60 minutes in other competitor's product Y, indicating that boron ions are not able to be adsorbed well by the conventionally commercialized products. According to the hydrotalcite-like substance of the present example, however, the rate of adsorption of boron ions reached about 47% at the point of one-minute-stirring, more than 60% within 10 minutes and as high as 92.2% after stirring for 60 minutes.

As shown in FIG. 6, a rate of adsorption of fluoride ion was 0% after stirring for 60 minutes in the competitor's product X, while 30.1% in other competitor's product Y. According to the hydrotalcite-like substance of the present example, however, it was about as high as 79.1% after stirring for 60 minutes, 4) 100 ml sample solutions containing chromium ions of 50 ppm, boron ions of 100 ppm, and fluoride ions of 80 ppm, at initial concentrations, respectively, were prepared. Like in the foregoing test, 1 g of a powder sample of the hydrotalcite-like substance produced according to the present example was added to each sample. After stirring for 10 minutes by a magnetic stirrer, each sample was filtered. The result is shown in Table 2 below.

TABLE 2

|  | CHROMIUM | BORON | FLUORINE |
|---|---|---|---|
| INITIAL CONCENTRATION | 50 ppm | 100 ppm | 80 ppm |
| POST-TREATMENT CONCENTRATION | 0.036 ppm | 7.8 ppm | 16.7 ppm |

It was confirmed that the anion concentrations were reduced to 0.036 ppm, 7.8 ppm, and 16.7 ppm, respectively after the processing, showing the remarkable anion adsorption effect in each anion species due to the same hydrotalcite-like substance.

As is apparent from the foregoing, it was proved that the hydrotalcite-like substance of the example has a remarkable adsorption effect beyond the effect by ion selectivity against any anion including boron ions as compared with the conventional hydrotalcite products that have been marketed in the past. This is attributed to the synergistic effect of the following two conditions: one is the crystalline size of the hydrotalcite-like substance being as small as in the nano order; the other is the large basal spacing. Owing to the effect, incomparable anion and cation adsorption capacities can be obtained.

5) As follows is a result of an test where the hydrotalcite-like substance of the present example was added to a first sample comprising boron-containing waste water discharged from an actual glass fiber factory, and a second sample comprising the first sample with carbonic acid removed therefrom, respectively, and it was examined whether the presence of carbonic acid affects the boron adsorption capacity.

Table 3 shows a result of water analysis of the wastewater actually used as a sample, in which boron concentration was 130 mg/L, while total carbonic acid concentration was 62 mg/L.

TABLE 3

| PARAMETER | ANALYTICAL VALUE (mg/L) |
|---|---|
| PH | 7.3 |
| SS | 28 |
| Boron | 130 |
| Fluorine | 2.6 |
| Chromium | less than 0.1 |
| Selenium | less than 0.01 |
| Arsenicum | less than 0.01 |
| TOC | 44 |
| Total Carbonic Acid | 62 |
| Chlorine | 17,000 |
| $NO_2\_N$ | less than 0.2 |
| $NO_3\_N$ | less than 0.2 |

Hereafter, an experimental procedure is explained.

The above-mentioned waste water was diluted with distilled water, and the concentration of boron was adjusted to about 10 mg/L. In the first sample, the diluted waste water was made acidic to have a pH of 2, and deaeration process was performed for 10 minutes, and thus carbonic acid was removed. In the second sample, such deaeration process was not performed.

Subsequently, pH of each sample was adjusted to 10, while the hydrotalcite-like substance of 1000 mg/L or 2000 mg/L was added thereto, which were then agitated by a stirrer for 60 minutes, and filtered through a filter paper No. 5 to thereby obtain treated water.

The treated water obtained was then subjected to water analysis, using "Pack Test" (registered trademark) and thus the boron concentration of the treated water was measured. Table 4 shows the measurement result of the boron concentration.

TABLE 4

| Run No. | 1 | 2 | 3 | 4 |
|---|---|---|---|---|
| Decarbonization | Yes | Yes | No | No |
| pH Control (—) | 10 | 10 | 10 | 10 |
| Adsorbent Loadings (mg/L) | 1,000 | 2,000 | 1,000 | 2,000 |
| Boron in Treated Water (mg/L) | 3 | 2 | 3 | 2 |
| Boron Removal Rate (%) | 70 | 80 | 70 | 80 |
| Amount of Adsorption of Boron (mg/g-R) | 7 | 4 | 7 | 4 |

Figure 7:
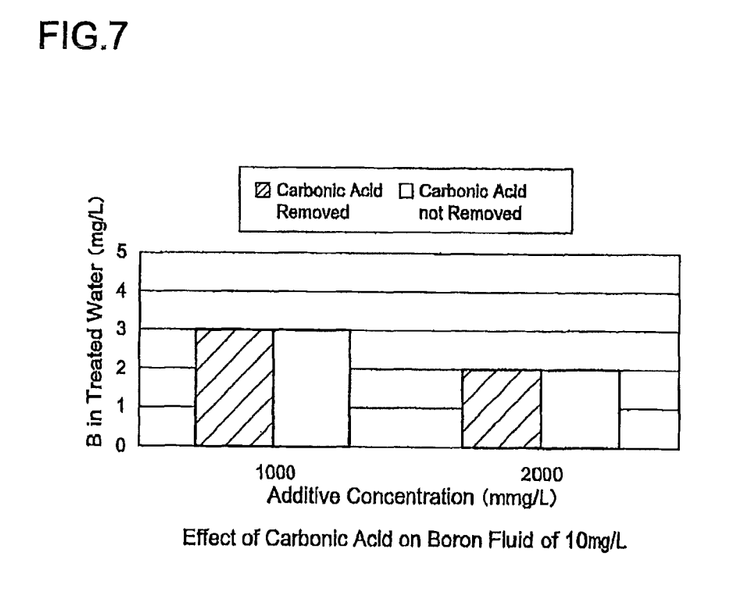
FIG. 7 is a graph showing a result of a test performed to see whether boron adsorbability varies depending on the absence or presence of carbonic acid.

FIG. 7 is a graphical representation of the results shown in Table 4. As shown in Table 4 and FIG. 7, no difference in boron adsorption property was seen between a decarbonized boron solution and a non-decarbonized one. Thus, it was proved that the presence of carbonic acid does not affect the adsorption property of the hydrotalcite-like substance.

Second Example

Next is a description of a method of immobilizing a hazardous substance using the hydrotalcite-like substance obtained in the foregoing example.

The hydrotalcite-like substance is used in such a manner that if it is in a slurry form obtained by for example dispersing in water, it is pushed out toward the target object containing a hazardous substance, using a manual or a pressure pump, or others means. Alternatively, the hydrotalcite-like substance that is dried and reduced to powder may be used in such a manner that it is pushed out toward the target object containing a hazardous substance, using a manual or a pressure pump, or others means.

As described above, the present example of the invention is such that a hydrotalcite-like substance is synthesized by mixing the acidic solution containing aluminum ions and magnesium ions with the alkaline solution containing alkali, and then it is subjected to water removal or neutralization process without ageing; and the hydrotalcite-like substance thus obtained is directly added to a target object.

Accordingly, ion exchange against the anions of the target hazardous substance takes place efficiently so that the anions of the hazardous substance are introduced into the hydrotalcite-like substance. As a result, the hazardous substance can be fixed and confined in the hydrotalcite-like substance.

Alternatively, alkali may be added to the target object beforehand, and then the hydrotalcite-like substance of the first example may be added thereto. By adding alkali in advance, it is possible to prevent the decomposition of the hydrotalcite-like substance in the case that the target object is acidic and contacts the hydrotalcite-like substance.

Third Example

The method of immobilizing a hazardous substance in accordance with the third example of the invention proposes pouring the acidic solution containing aluminum ions and magnesium ions used in the foregoing examples into a target object while mixing the same with alkali.

By pouring the acidic solution while mixing it with alkali, anions of the hazardous substance can be immobilized due to anion exchange that takes place in the production process of the hydrotalcite-like substance. By immobilizing the anions of the hazardous substance in the production process of the hydrotalcite-like substance thus way, more efficient immobilization of the hazardous substance can be achieved as compared to a case where the hydrotalcite-like substance synthesized beforehand or a powder thereof is added.

The method according to the present example is applicable to a target object containing hazardous substances, such as soil that has already underwent solidification treatment with cement etc. In the meantime, the acidic solution and the alkali may be added to a target object by spraying other than by pouring.

Fourth Example

The method of immobilizing a hazardous substance in accordance with the fourth example of the invention proposes using zeolite and/or bentonite together with the hydrotalcite-like substance produced in the foregoing examples. Anions of the hazardous substance are immobilized by the hydrotalcite-like substance, while cations thereof are immobilized by the zeolite and/or bentonite added, so that the anions and cations of the hazardous substance can be both removed, thus making it possible to contribute to detoxication and stabilization of hazardous substances, such as refuse incineration ashes.

Furthermore, since zeolite and/or bentonite is capable of maintaining a weak alkali atmosphere, it is also possible to make a contribution to stabilization of the hydrotalcite-like substance.

For example, if a target object to be immobilized is the contaminated soil contaminated with a certain hazardous substance, the hydrotalcite-like substance of the invention may be added to this contaminated soil together with zeolite and/or bentonite. As for the manner of addition, they may be mixed with water and then a mixture thus obtained may be either poured into or sprayed to the contaminated soil. Further, if a target object is refuse incineration ashes or the like containing a hazardous substance, the hydrotalcite-like substance of the invention may be added thereto together with zeolite and/or bentonite.

Alternatively, the soil may be covered with a layer of zeolite and/or bentonite, and another layer of earth and sand containing the hydrotalcite-like substance of the invention, whereby the soil may be covered with a soil filter containing zeolite and/or bentonite, and further with another soil filter containing the hydrotalcite-like substance, thereby enabling anions of hazardous substances deposited on the soil from above together with rain or the like to be immobilized by the filter containing the hydrotalcite-like substance, and then cations thereof to be immobilized by the filter containing zeolite and/or bentonite.

Accordingly, if the soil around disposal sites for wastes, such as refuse incineration ashes, is covered with these filters, the hazardous substances from a garbage dump can be immobilized effectively, and thus it is very effective for pollution control of soil.

The present invention should not be limited to the foregoing method of producing the hydrotalcite-like substance and the method of immobilizing a hazardous substance, but various changes and modifications should be construed as being included therein unless such changes and modifications depart from the scope of the invention.

The invention claimed is:

1. A process for immobilizing a hazardous substance, which comprises the step of adding a hydrotalcite-like substance to an object to be immobilized in a manner that the synthesis of the hydrotalcite-like substance occurs directly on the object to be immobilized through the mixing of an acidic solution containing aluminum ions and magnesium ions with an alkaline solution containing alkali, and then subjecting the hydrotalcite-like substance to water removal process or neutralization process;
wherein the hydrotalcite-like substance is represented by a general chemical formula: $Mg^{2+}_{1-x}Al^{3+}_{x}(OH)_{2}(A^{n-})_{x/n} \cdot mH_{2}O$, said $A^{n-}$ being anion with charge $-n$, and
wherein zeolite and/or bentonite are/is used together with said hydrotalcite-like substance.

2. The process for immobilizing a hazardous substance, according to claim 1, wherein said acidic solution is added to the object to be immobilized after adding alkali to the object.

3. The process for immobilizing a hazardous substance according to claim 1, wherein a molar ratio of said aluminum ions to said magnesium ions is in a range of from 1:5 to 1:2.

4. The process for immobilizing a hazardous substance according to claim 1, wherein said acidic solution contains aluminum compound and/or magnesium compound that are/is not dissolved therein.

5. The process for immobilizing a hazardous substance according to claim 1, wherein at least one selected from a group consisting of alumina, sodium aluminate, aluminum hydroxide, aluminum chloride, aluminum nitrate, bauxite, residue left after producing alumina from bauxite and aluminum sludge is used as an aluminum source of said aluminum ions.

6. The process for immobilizing a hazardous substance according to claim 1, wherein at least one selected from a group consisting of brucite, magnesium chloride, magnesium hydroxide, magnesite and calcined magnesite is used as a magnesium source of said magnesium ions.

7. The process for immobilizing a hazardous substance according to claim 1, wherein at least one selected from a group consisting of sodium hydroxide, calcium hydroxide, lime and solidification material for cement is used as said alkali.

8. The process for immobilizing a hazardous substance according to claim 1, wherein neither said acidic solution nor said alkaline solution contains carbonate ions.

9. The process for immobilizing a hazardous substance according to claim 1, wherein the object to be immobilized is a contaminated soil polluted with a hazardous substance, wastes containing contaminated water or a hazardous substance, or a leachate thereof, and said hydrotalcite-like substance is added to the contaminated soil or wastes together with zeolite and/or bentonite.

10. The process for immobilizing a hazardous substance according to claim 1, wherein said contaminated soil is covered with a filter layer of zeolite and/or bentonite, and another filter layer of said hydrotalcite-like substance.

11. A process for immobilizing a hazardous substance according to claim 1, comprising the step of adding to said object to be immobilized an acidic solution containing aluminum ions and magnesium ions, while mixing with alkali.

* * * * *